United States Patent [19]
Thalenfeld et al.

[11] Patent Number: 5,719,366
[45] Date of Patent: Feb. 17, 1998

[54] METHOD FOR MANUFACTURE OF RACK AND SHELVING SYSTEM

[75] Inventors: David R. Thalenfeld, Bear Creek, Pa.; Thomas O. Nagel, Blairstown, N.J.

[73] Assignee: Trion Industries, Inc., Wilkes-Barre, Pa.

[21] Appl. No.: 378,187

[22] Filed: Jan. 25, 1995

[51] Int. Cl.⁶ .................................................. B23K 11/06
[52] U.S. Cl. .................................................. 219/56; 29/429
[58] Field of Search ........................... 29/429; 211/106, 211/112, 119; 219/56, 86.33, 88

[56] References Cited

U.S. PATENT DOCUMENTS

| | | |
|---|---|---|
| 676,560 | 6/1901 | Jacobs . |
| 3,056,883 | 10/1962 | Eisenburger et al. .............. 219/56 X |
| 3,676,631 | 7/1972 | Ritter et al. ...................... 219/56 |
| 3,699,756 | 10/1972 | Ritter et al. ...................... 219/56 |
| 4,106,736 | 8/1978 | Becker, III et al. . |
| 4,340,144 | 7/1982 | Cousins . |
| 5,143,228 | 9/1992 | Arnold . |

*Primary Examiner*—Joseph M. Gorski
*Attorney, Agent, or Firm*—Schweitzer Cornman Gross & Bondell LLP

[57] ABSTRACT

A novel method and apparatus is disclosed for the production of single plane ladder-type rack strip material in which wire cross bar elements are Tee-welded to the inside surface portions of opposed, parallel side elements formed of similar wire material. The welding procedure involves contacting the cross bar element centrally with an electrode of a first polarity and contacting the wire side elements on opposite sides with electrodes of a second polarity. During the welding operation, current flows substantially equally from the first electrode in opposite directions through the opposite weld interfaces to the opposed second electrodes. By observing physical symmetry in the electrical supply at opposite sides, equalization of current flow is optimized so that the emerging rack strip product is flat and straight, suitable for commercial marketing. By forming the rack strip elements in a single plane, the elements can be formed into a wide variety of modular components for the assembly of a variety of useful rack and shelving structures. Novel forms of mounting and connecting blocks are also disclosed.

9 Claims, 9 Drawing Sheets

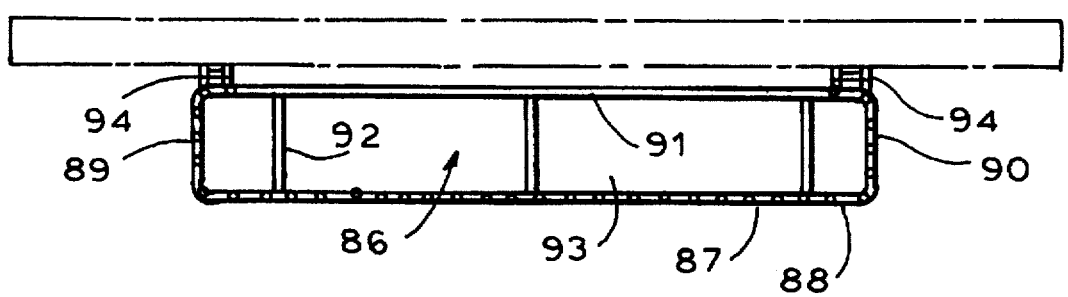
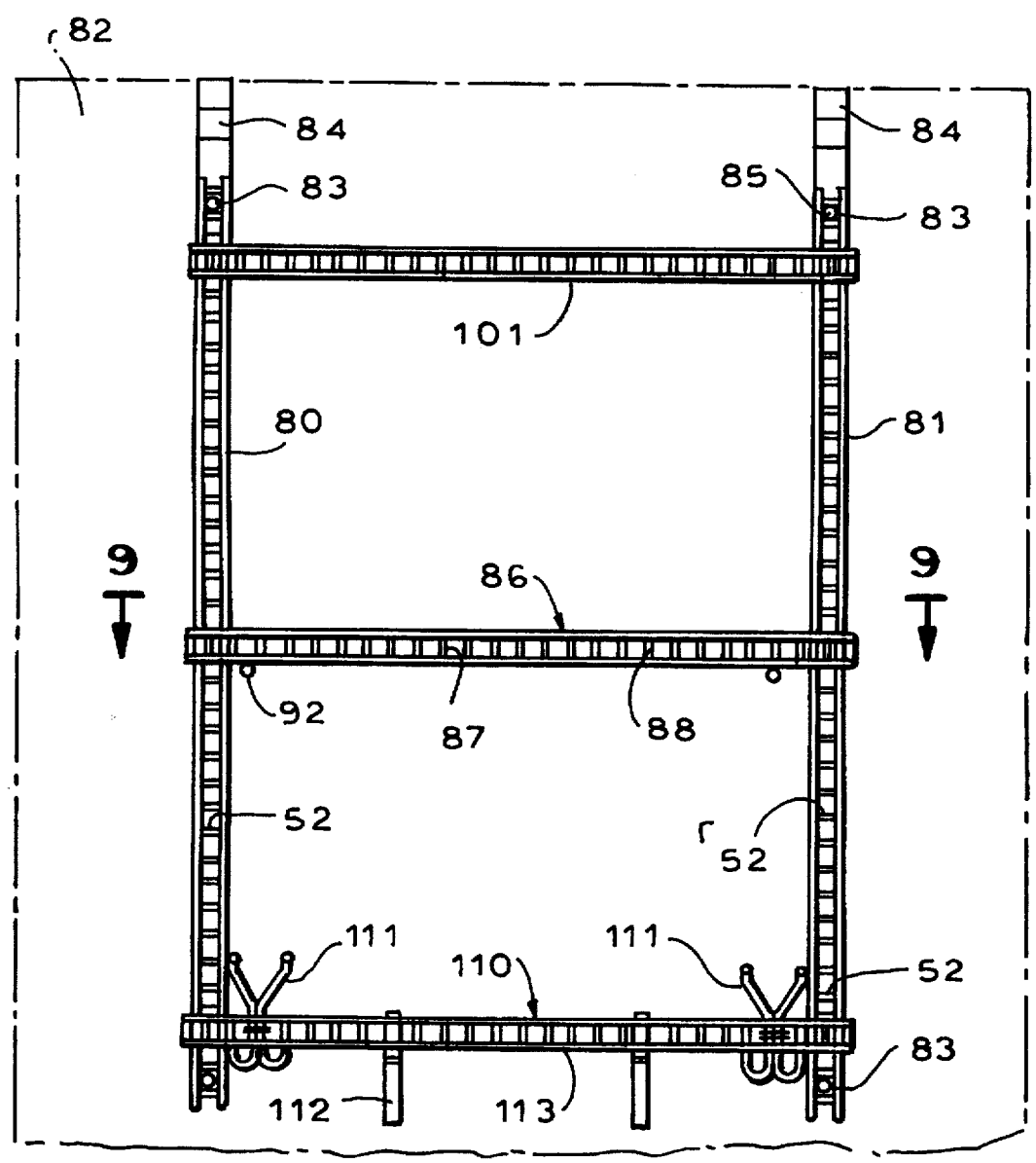

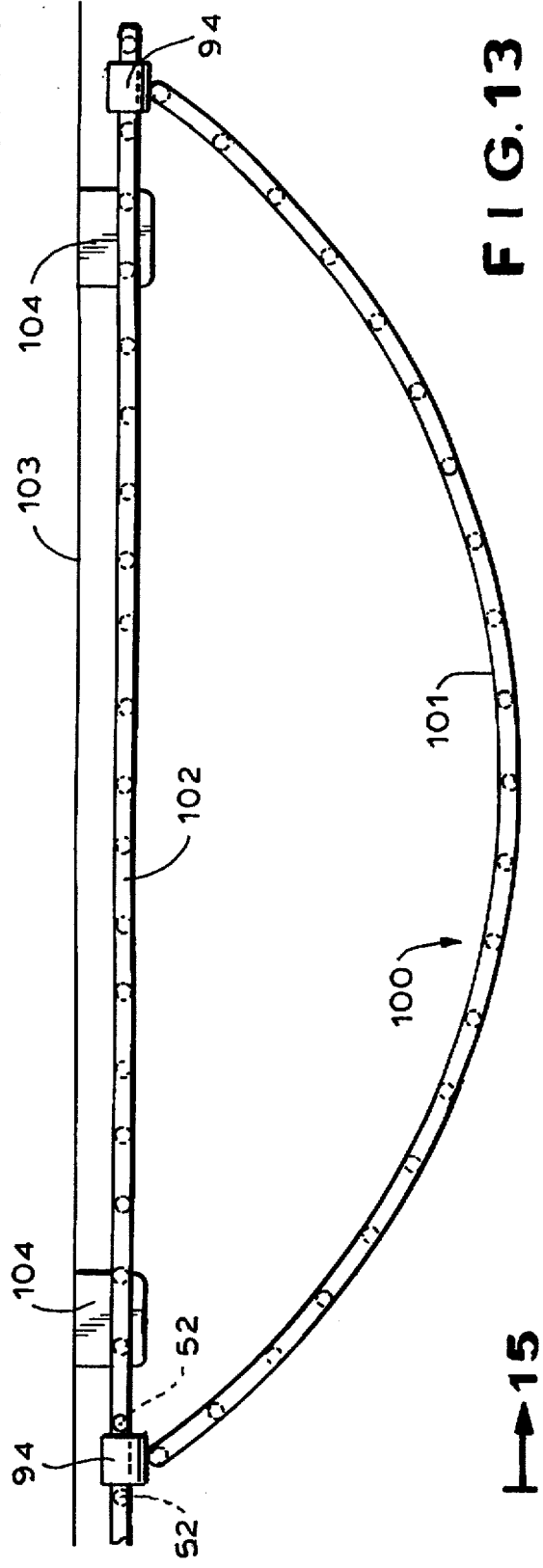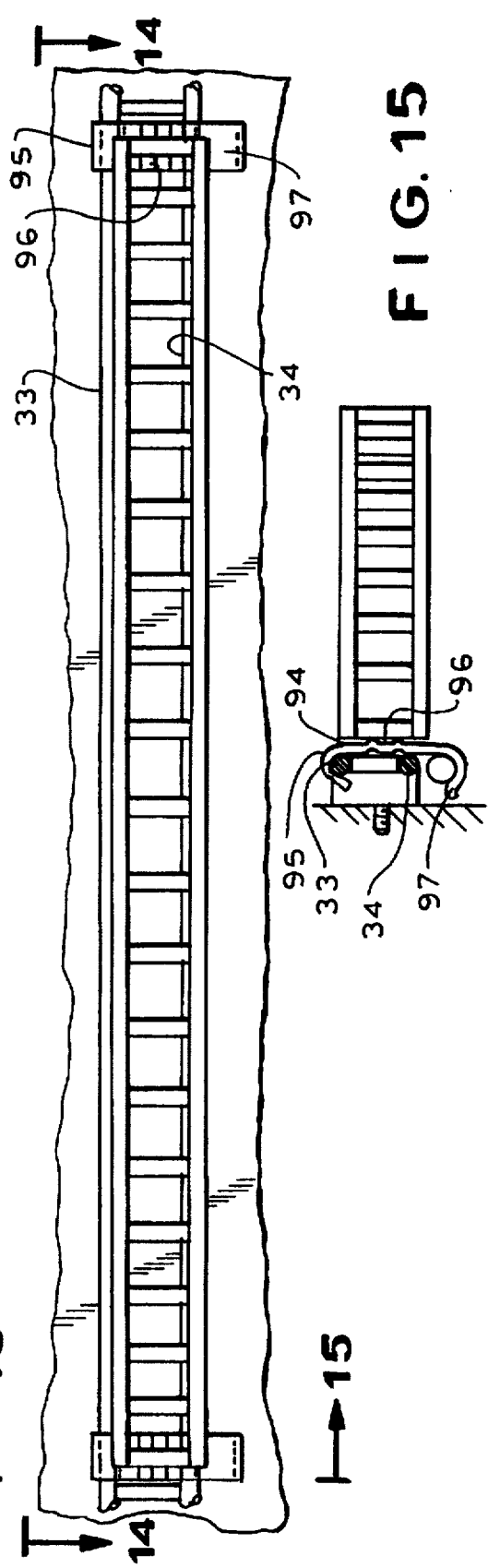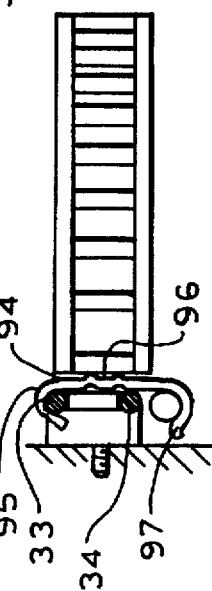

METHOD FOR MANUFACTURE OF RACK AND SHELVING SYSTEM

BACKGROUND AND SUMMARY OF THE INVENTION

Various rack and shelving systems have been proposed in the past, which involve the use of wire grids to provide multiple locations for mounting or suspending other items. A theoretically particularly desirable form of such grid has a "ladder" configuration, comprising spaced-apart, longitudinally extending side elements and a plurality of cross bars forming rectangular openings and providing a variety of locations and orientations for the mounting and suspension of other elements.

In the interest of producing ladder-type rack elements on an economical basis, it has been proposed to utilize continuous links of wire for the side elements, and short sections of similar wire to form the cross bars, securing the cross bars to the side elements by welding. Heretofore, however, the process of welding cross bar elements to the side elements in a common plane has proven to be insurmountable on a production basis because of the difficulty of achieving uniform welding conditions at opposite ends of a given cross bar element. In the absence of such uniform conditions, the welded product becomes significantly distorted, so as to be both unacceptable in appearance and impractical to utilize in a modular rack system. As an alternative, it has proven feasible to weld cross bar elements to spaced-apart side elements by placing the cross bar elements on top of the side elements, in a different plane, and welding each end of a cross bar element to the side elements in a crossing fashion. While it is possible with this technique to achieve satisfactory welding results, the resulting product is less than satisfactory because the side elements and the cross bars are in different planes, and the ends of the cross bars are exposed at the sides. This has greatly limited the desirability and usefulness of the product.

In accordance with the present invention, a novel method and apparatus is provided, which enables high speed production of ladder-type rack elements, in which the cross bars are "T" welded at each end to the side elements, in a manner to achieve a high level of uniformity of welding at each end. The resulting product is a ladder-type rack element in which both the side elements and the cross bars are in a common plane, providing a useable rack element which is of superior appearance and usefulness.

In the process of the invention, separate wire rods, to form side elements, are fed, preferably in incremental steps corresponding to the spacing of cross bars, through a welding station. Separately, an indexed conveyor mechanism advances cut-off wire cross bar sections in a uniformly spaced-apart manner into aligned and centered position between the side elements. When a particular cross bar element reaches the welding station, a first electrode is brought into contact with central portions of the cross bar. In addition, a set of second electrodes, located externally of the side elements, are pressed inwardly under controlled pressure, such that the side elements are tightly and uniformly pressed into contact with the opposite ends of the cross bar. When the electrodes are in position, a large current flow is initiated between the first electrode, contacting the central portion of the cross bar, and the opposed second electrodes to achieve an electric resistance weld at each end of the cross bar. Substantial uniformity of welding at each end of the cross bar is critically important, and care is taken in the construction of the equipment to assure symmetry in the current path leading to the various electrodes. Inasmuch as the current flow rates are extremely high (for example, 50–100,000 amperes) lack of symmetry can lead to unequal results at opposite ends.

Desirably, the opposed second electrodes are in the form of relatively large diameter electrode wheels, which maintain contact with the side elements during indexing movements following each welding operation. In order to avoid distortion of the side elements, however, which may be somewhat soft and pliable in the area of the weld immediately following the cessation of current flow, indexing of the wires is desirably accompanied by a temporary reduction in confining pressure applied by the opposed electrodes.

The procedure of the invention results in the production of continuous lengths of ladder-type rack material. These continuous lengths are cut to useable sizes and shaped, if necessary, to form useful rack and shelving elements.

In accordance with one aspect of the invention, simplified mounting and clamping devices are provided, which enable the rack elements to be mounted and assembled in a limitless variety of useful configurations.

For a more complete understanding of the above and other features and advantages of the invention, reference should be made to the following detailed description of preferred embodiments of the invention and to the accompanying drawings.

DESCRIPTION OF THE DRAWINGS

FIG. 6 is an enlarged fragmentary view illustrating cooperation between a central electrode and a cross bar element, during a welding operation at the welding station.

FIG. 8 is a front elevational view of a typical form of rack and shelving arrangement, formed with the single plane ladder-type rack elements produced by the system of FIGS. 1 and 2.

FIG. 9 is a cross sectional view as taken generally along line 9—9 of FIG. 8.

FIG. 13 is a front elevational view of yet another form of rack structure configured with the material of the invention.

FIGS. 14 and 15 are views taken generally on lines 14—14 and 15—15 respectively of FIG. 13.

Description of Preferred Embodiments of the Invention

Figure 1:
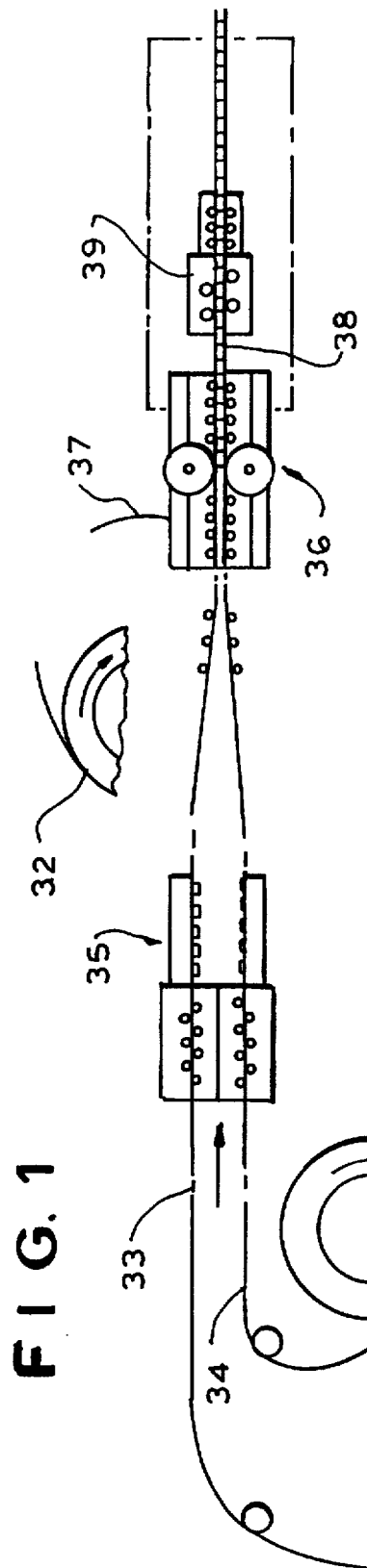
FIG. 1 is a schematic top plan view of a production line for the manufacture of single plane ladder-type rack material according to the invention.
Figure 2:
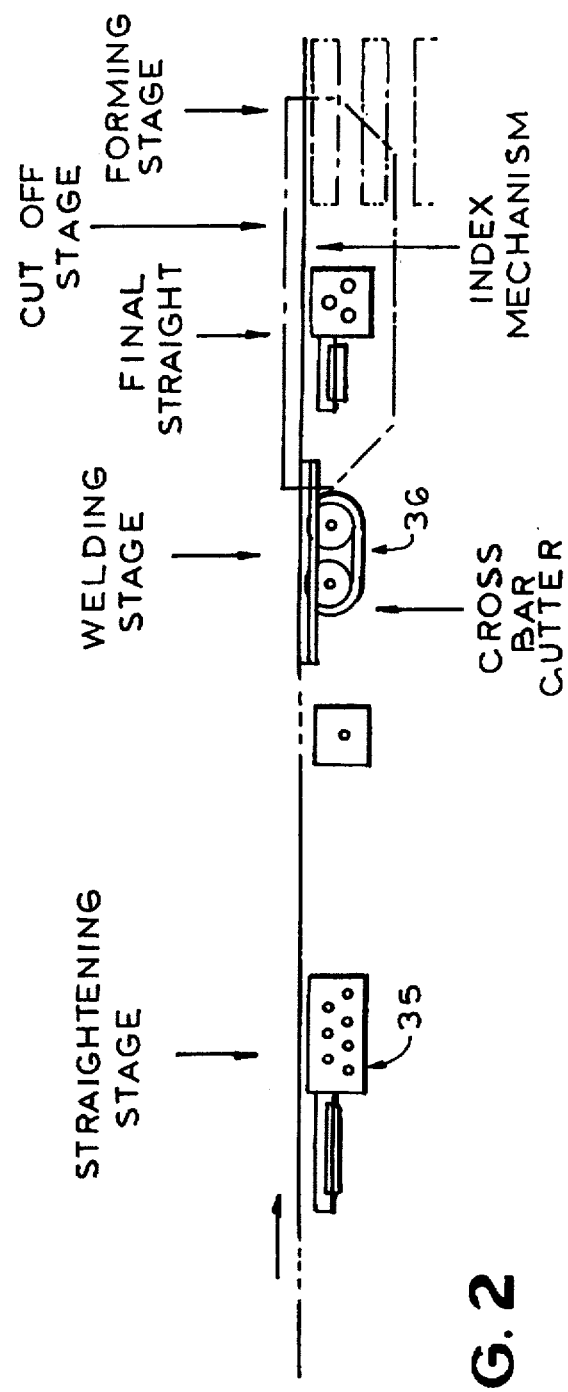
FIG. 2 is a schematic elevational view of the production line of FIG. 1.

Referring now to the drawing, and initially to FIGS. 1 and 2 thereof, an advantageous form of production line pursuant to the invention includes first and second substantially continuous sources of wire rod material 30, 31, which supply the wire rod side elements for the rack strip, and a third substantially continuous supply 32, which provides cross bar elements. Although sizes obviously may be varied, a typical and advantageous size of wire rod for the side elements and cross bar elements may be a 3/16 diameter steel wire. Wire side elements 33, 34 leading from the supplies 30, 31 are initially passed through a straightening section 35 of conventional design and then guided convergently into a welding station 36, to be described in greater detail. Wire rod 37 from the third source 32 is brought to the production line slightly in advance of the welding position, oriented at right angles to the wire side elements 33, 34. The wire 37 is cut into individual cross bar segments, of a length corresponding to the desired spacing between the wire rods 33, 34, and these segments are fed successively into a position between the wires 33, 34 and in the same plane as the side wires. Pursuant to the invention, and as will be described in greater detail hereinafter, the individual cross bar elements are Tee-welded to the side elements 33, 34 in the welding station 36.

The ladder strip material 38 exiting from the welding station may, if necessary, be subjected to minor straightening in a straightening section 39. As the rack strip 38 emerges continuously from the final straightening stage 39, it is cut to predetermined, desired lengths. For many purposes, the rack strip is bent into predetermined shapes. The bending operations can be done as separate operations or, if desired, as part of the continuous production operation.

Figure 3:
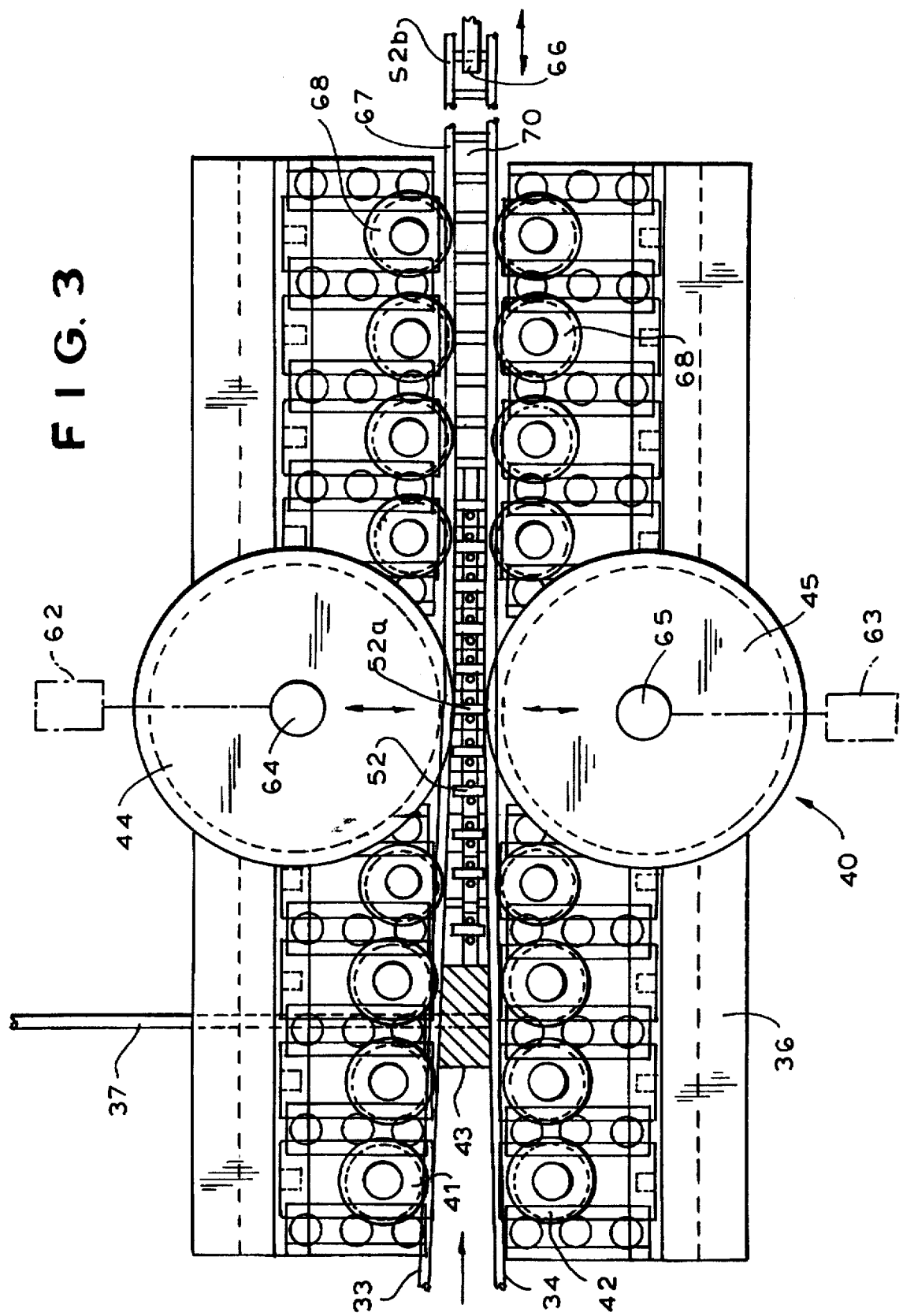
FIG. 3 is a fragmentary top plan view showing details of the welding station forming part of the production line of FIG. 1.
Figure 4:
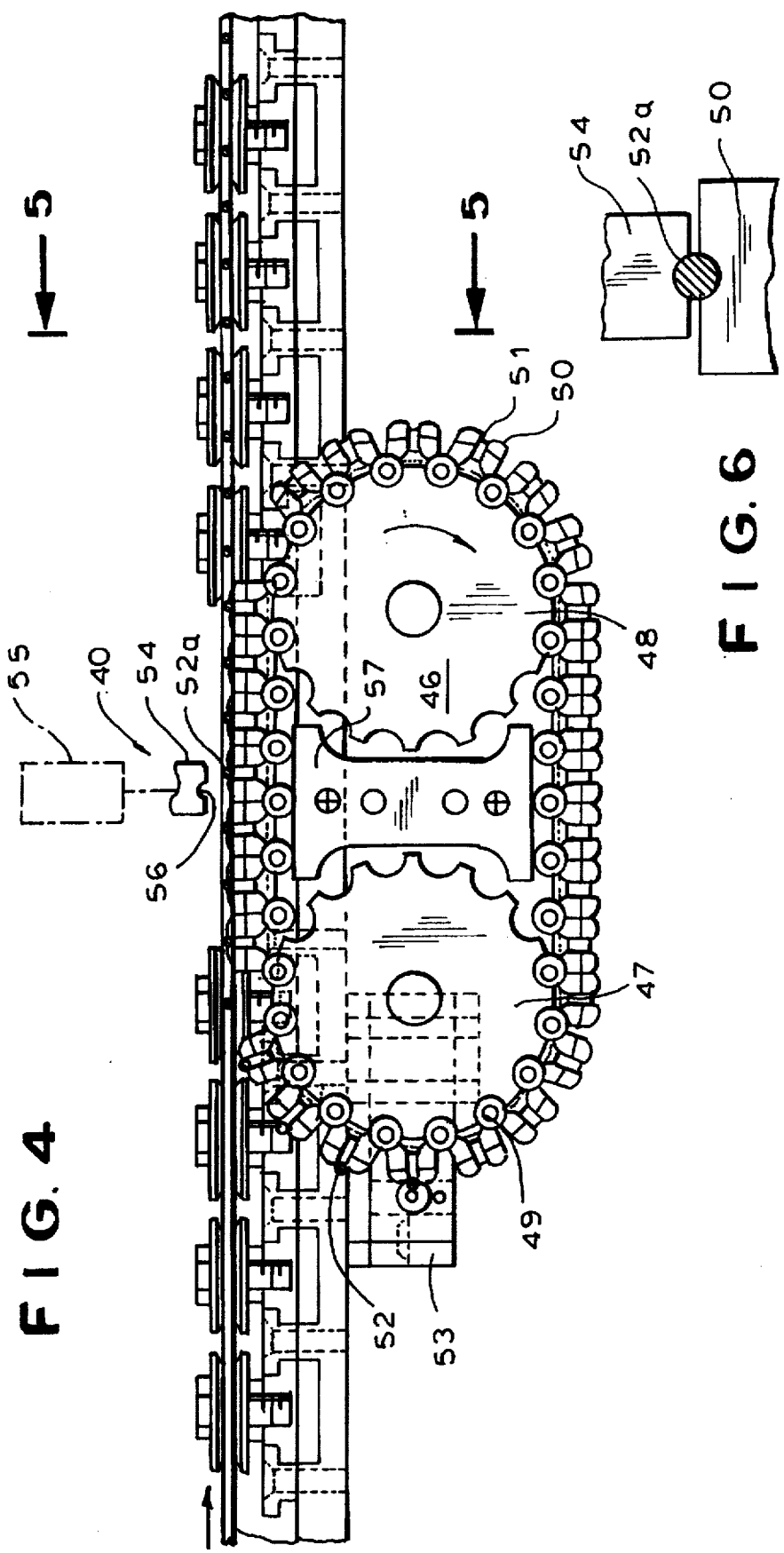
FIG. 4 is a side elevational view of the welding station of FIG. 3.
Figure 5:
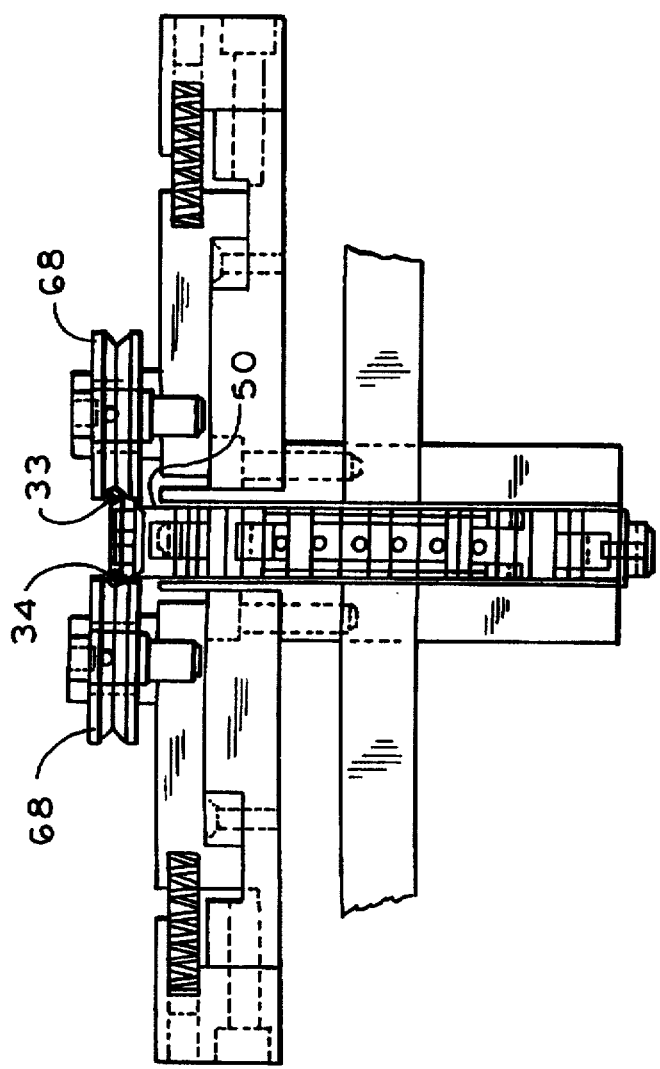
FIG. 5 is a fragmentary cross sectional view as taken along line 5—5 of FIG. 4.

A critical aspect of the invention is the symmetrical and uniform Tee-welding of each of the cross bar elements to inner side surface portions of the side members in such manner that the cross bar elements lie in the same plane as the side members, with the rack strip being straight and flat, free of twists and curves and the like. In the apparatus of the invention, the side elements 33, 34 are guided toward a welding position 40 through a convergent path defined by a series of entry side guide rollers 41, 42 and a spacing block 43. The spacing block advantageously is formed of an insulating material. The illustrated welding station 40 is advantageously formed in part by opposed electrode wheels 44, 45 mounted for rotation in a common (horizontal) plane for engagement with the wire side elements 33, 34 from the entry side guide rollers. The electrode wheels 44, 45 are suitably grooved with a semi-circular cross sectional contour to closely embrace the outer cylindrical contours of the respective wire elements 33, 34, as is evident in FIG. 3 of the drawings.

Between the electrode wheels 44, 45, and generally below the plane thereof, is an endless conveyor mechanism, generally designated by the numeral 46, which includes a pair of indexable sprocket wheels 47, 48 and a conveyor chain 49 trained thereabout. The conveyor chain mounts a plurality of carrier blocks 50, preferably formed of insulating material, each formed with a transverse, semi-cylindrical recess 51 of a size to snugly receive individual cross bar elements 52 severed from the supply wire 37. As the cross bar supply wire 37 is advanced, it is successively cut to form cross bar elements of desired length by a suitable cut-off mechanism 53. Individual, cut cross bar elements 52 are immediately placed in a carrier block recess 51 and incrementally advanced by the conveyor 46 toward the welding position 40.

As individual cross bar elements 52 are successively indexed by the conveyor 46, a cross bar element 52a (FIG. 3) eventually arrives at the welding position 40, directly between and aligned with the axes of the respective electrode wheels 44, 45. Desirably, the motion of the side elements 33, 34 and the conveyor 46 is intermittently indexed, rather than continuous, so that motion is momentarily interrupted when a welding operation is to take place.

Pursuant to the invention, an electrode 54 is retractably mounted, as by a suitable fluid or mechanical actuator 55, above the common plane defined by the wire side elements 33, 34. When a cross bar 52a is in the welding position, and indexing motion of the mechanism has been interrupted, the electrode 54 is brought downwardly under pressure by the actuator 55. The electrode 54 is provided with a cylindrically contoured recess 56 adapted for close reception of the cylindrical contour of a cross bar element 52a, located at the welding position. Thus, as shown in FIG. 6, a cross bar element is tightly gripped between the upper electrode 54 and the carrier block 50 located beneath. The movable carrier block is rigidly supported from underneath by support structure 57, enabling substantial contact pressure to be brought to bear by the electrode 54. Pursuant to the invention, the electrode 54 engages the cross bar element 52a centrally between its end extremities, and desirably makes contact with the cross bar over a substantial portion of its length.

In the process of the invention, the welding operation is achieved by delivering an extremely high current in a very short interval. By way of example, in a production operation for the manufacture of rack strips using 3/16 inch diameter wire rod for the side elements and the cross bar elements, the welding current employed advantageously is in the range of 50,000–100,000 amperes, delivered in an interval of about 3 milliseconds.

In order to achieve uniformity of welding at opposite ends of the cross bar elements, which is critically important in order to achieve a commercially acceptable product, it is important to achieve maximum symmetry in the physical arrangement of the electrical supply system feeding the wheel electrodes 44, 45 and the central electrode 54. To this end, the system includes a power supply transformer 57 (FIG. 7) which converts the commercial electrical power, indicated at 58, to a low voltage, high current supply necessary for the welding operation. The conversion transformer 57 is located centrally, directly above or directly below the axis of the machine so that its output terminals are substantially equidistant from the respective electrode wheels 44, 45 and, insofar as practical, with the same physical configuration of supply conductors 59, 60. The supply conductors are also arranged symmetrically with respect to the supply conductor 61 leading to the central electrode 54. These physical arrangements are important in order to assure, to the greatest extent possible, equality and uniformity of electrical conditions for each of the welding locations.

Figure 7:
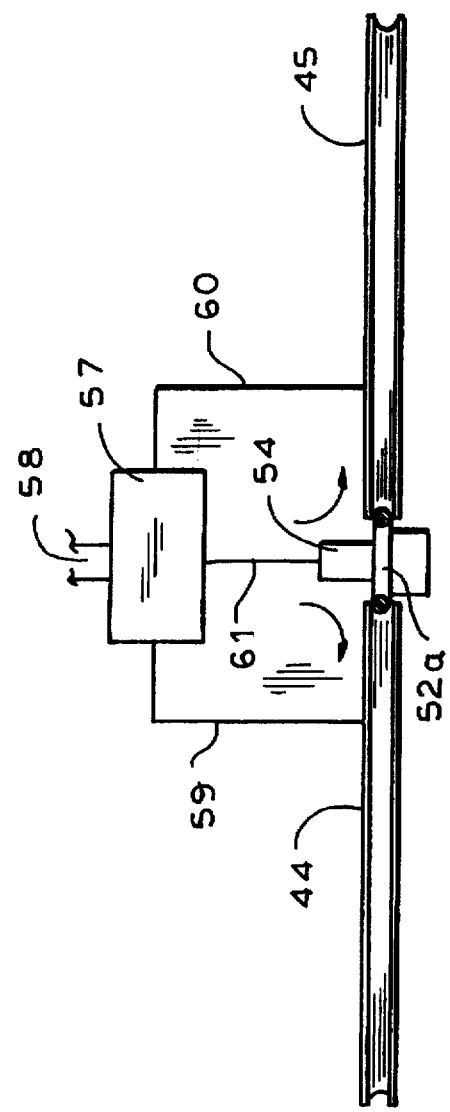
FIG. 7 is a schematic illustration of the equipment, shown at the welding station.

As evident in FIG. 7, when a welding operation is initiated, current flows from the central, positive electrode 54 equally and in opposite directions toward the electrode wheels 44, 45, serving as negative electrodes. Because of resistance at the interface between the end surfaces of the cross bar element 52a, and the contacting inner side surfaces of the respective side elements 33, 34, extreme heat is developed at such interface, causing fusion of the cross bar elements with the side elements. The welding action per se is well known electric resistance welding procedure. It is uniquely applied in the present invention by simultaneously Tee-welding opposite ends of the cross bar to the opposed side elements 33, 34 with consistency and uniformity such that a continuously produced single plane, ladder-type rack strip is straight, flat and uniform, suitable for commercial utilization.

In the method and apparatus of the invention, provision is made for applying substantial contact pressure between the side elements 33, 44 and the cross bar element 52a during the welding operation. This is accomplished by means of controllable actuators 62, 63 arranged to act on supporting spindles 64, 65 of the electrode wheels 44, 45, for controllably urging the electrodes toward each other. During the application of welding current, it has been found desirable to apply approximately 800 pounds pressure to the electrode wheels, which may have a typical size of 5½–6 inches, for example. Following the welding operation, however, and during the subsequent indexing advance of the rack strip in preparation for the next welding operation, it is desirable to relieve the squeezing pressure applied by the actuator 62, 63, so as not to deform the side elements 33, 34 in areas between successive cross bar elements. For this purpose, the system includes actuator control means (not specifically illustrated) for reducing pressure applied by the actuators 62, 63 during such indexing movements, preferably to a level of about 100 pounds. Some level of pressure is desired during the indexing movement, in order to maintain control over the configuration of the elements during the initial cooling phase.

Indexing of the materials may be accomplished in a variety of ways. However, a particularly desirable and effective system for this purpose is to engage a previously welded cross bar element 52b (FIG. 3) by means of a reciprocating pawl 66. The pawl is controllably reciprocated by any suitable means, and has a stroke corresponding to the center-to-center distance between successive cross bar members 52 in the rack strip. Thus, each time the pawl reciprocates, a welded cross bar element is engaged and pulled in the direction of advancement. In a typical setup according to the invention, the pulling force required to be applied by the pawl 66 is quite substantial, in that it is required to draw wire for the side elements 33, 34 from their respective supplies, through the resistance of the straightening stage, the various entry side and exit side guide rollers and the final straightening phase. This enables the reciprocating pawl 66 to serve as an effective weld testing facility, in that the force requirements of the pulling operation are substantially in excess of stresses to which the material will be subjected in normal use.

Because of the extraordinarily high levels of current flow during the actual welding operation, it is desirable to take steps to minimize the flow of stray currents in the system. To this end, it is desirable to cause the wire side elements 33, 34 to approach the welding station 40 on a convergent path, so as to prevent or at least minimize contact with unwelded cross bar elements 52. This is accomplished in the system of the invention by providing for the spacer block 43, positioned shortly in advance of the welding station 40, and having a width greater than the length of the cross bar elements 52.

After a welding operation has been completed, and while the weld areas are cooling, it is desirable to guide and confine the completed rack strip section 67. Advantageously, this is accomplished by means of a plurality of exit side guide rollers 68 located close to the welding electrodes 44, 45, on the "downstream" side thereof. In addition, if necessary, it may be desirable for the completed rack strip to pass through finish straightening stages 39 (see FIG. 2) where minor final straightening and alignment can take place. In view of the substantial rigidity of the rack strip at this stage, however, substantial rehabilitation of the rack strip is not feasible. Accordingly, it is particularly important to carry out the welding operation in a manner to achieve a product which is acceptable, or nearly so, in the first instance.

In a typical production line, the rack strip may be easily produced at a rate of two or more welds per second on a continuous basis. In a typical and advantageous rack strip made in accordance with the invention, typical spacing between centers of the cross bar elements might $13/16$ of an inch, providing for a one inch outside dimension when employing cross bar wires of $3/16$ inch diameter. Likewise, for many purposes, it is advantageous to provide an identical spacing between the side elements 33, 34, such that the open spaces 70 defined by the rack elements are square sided, with an open dimension of $5/8$ of an inch on a side. The external dimensions, between the outside surfaces of adjacent cross bars and between the outside surfaces of the respective side elements, is also one inch. Obviously, other sizes may be employed, although there are standardized grid dimensions employed in the industry which make the foregoing dimensions particularly preferred for many applications.

In a running production line, it would be appropriate to sever the continuously formed rack strip into useable commercial lengths. In some cases, these may be bent into special configurations and converted into shelf or rack elements, or the like.

Figure 10:
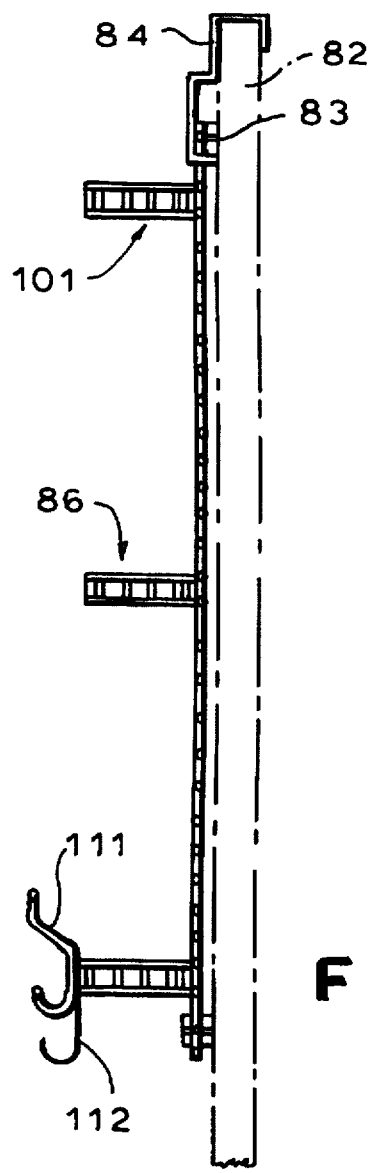
FIG. 10 is a side elevational view of the rack and shelving arrangement of FIG. 8.

With reference now to FIGS. 8–10 of the drawing, a new form of rack structure is illustrated, which can be made using the rack strip product of the invention. In the structure of FIG. 8, there are two straight vertical rack strips 80, 81 which extend vertically. These strips, which may be referred to as support strips, are mounted to a vertical surface 82, for example a door, by spaced mounting blocks 83, which will be described in more detail hereinafter. These mounting blocks may be employed in conjunction with optional support hooks 84 formed of thin material and adapted to be applied over the top of a door 82 to bear some or all of the weight of the rack. In a typical installation, the mounting blocks 83 are fastened to the underlying surface by means of screws 85 and serve to secure the support strips 80, 81 with a stand-off of, for example, $1/8$ of an inch from the underlying support surface.

The vertical support strips 80, 81 serve as a mounting base for horizontally disposed rack features, which may be of a wide variety of styles and types. In FIG. 9, for example, there is shown a shelf structure 86, which is formed of a length 87 of rack strip material which is shaped to provide a straight front section 88, opposite end sections 89, 90 and a straight back section 91. A plurality of support rods 92 are separately welded across the bottom of the front and back sections 88, 91 providing support for a shelf bottom 93, advantageously formed of glass or transparent plastic material, for example.

Rigidly secured to the back section 91 of the shelf structure are snap-on spring-type back plates 94. These are standard bent metal plates, as shown particularly in FIG. 15 of the drawings. Back plates of this style are well known in the art and are used in the manner indicated for removably attaching display hooks and the like to support racks. As reflected in FIG. 15, the illustrated style of back plate 94 has a downwardly opening hook portion 95 at the top, a generally vertically extending panel portion 96, and a generally circular spring portion 97 at the bottom. The distance between the uppermost recess portion of the hook 95, and the upper portions of the circular spring 97 is slightly less than the one inch spacing between external surfaces of cross bars 52 in FIG. 8 (or side members 33, 34 in FIG. 15). In accordance with known techniques, the back plates may be applied to rack strips 80, 81 by placing the hook portions 95 over corresponding cross bar elements 52 of the vertical rack strips, and then forcing the back plates to pivot inwardly until the circular spring portions 97 are compressed and forced beyond the centers of the cross bars at the next lower level. The relative dimensions of the circular spring portion 97 and the cross bars 52 are such that, when the back plates 94 are fully seated, they are in an "over-center" relation to the adjacent cross bar element 52, and are thus firmly locked in place by the action of the spring portion. In the illustration of FIGS. 8 and 9, the shelf unit 86 is provided with a pair of the back plates, spaced apart a distance equal to the center-to-center spacing of the two vertical support strips 80, 81. Thus, the shelf 86 can be simply snapped in place on the vertical rack strips 80, 81 to provide an effectively permanent shelf assembly.

In FIGS. 13–15, there is shown a different form of rack element 100, formed of an arc-shaped section 101 of the rack strip material. At each end, the rack strip 101 has welded thereto a spring-type back plate 94 as previously described. In the specific illustration of FIGS. 13–15, the arcuate rack element 100 is secured by its spaced-apart back plates 94 to a horizontal section 102 of rack strip material, which is secured to a support surface 103 by stand-off blocks 104 so as to be spaced from the support surface. The spacing of the back plates 94 at each end is not important, as the upper and lower elements 33, 34 of the horizontal rack section 102 are continuous.

The rack element 100 may also be installed in the rack structure of FIG. 8, by mounting the spaced back plates 94 on the vertical support strips 80, 81, substantially in the same manner as with the shelf unit 86. In the latter case, the spacing of the back plates 94 must agree with the spacing of the vertical rack strips 80, 81.

Figure 12:
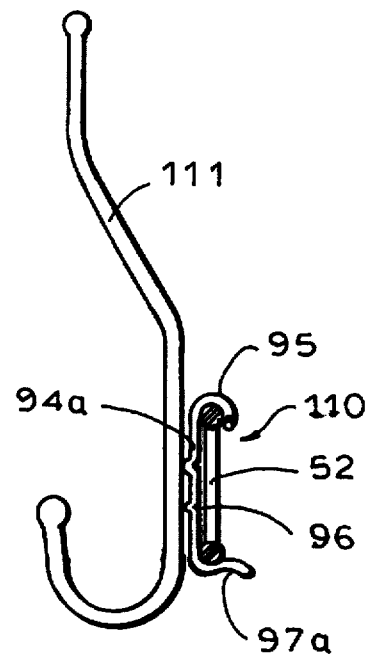
FIG. 12 is an enlarged cross sectional view taken generally on line 12—12 of FIG. 11.

At the bottom of the rack structure of FIG. 8 is a rack element 110, which may be in the form of the shelf 86, the arcuate rack element 100, or some other form. The rack element 110 is attached to the vertical support strips 80, 81 by back plates 94 in the manner heretofore described, being attached to vertically adjacent cross bar elements 52 at each side. By way of illustration only, the rack element 110 has attached thereto clothing hooks 111, mounted by means of clip-type back plates 94a, as shown in FIG. 12 of the drawings. The clip-type back plates 94a, which in themselves are of known design, utilize a clip arm 97a to grip the lower rod of the rack, as indicated in FIG. 12. The rack element 110 is also shown as mounting hangers 112, which may be formed of sheet metal and simply hung over the rack strip 113 which forms a component of the rack element 110. The clip-type back plates 94a may also be employed in place of the spring-type plates 94 for mounting of the rack elements themselves, as well as accessory elements, as will be understood.

Figure 11:
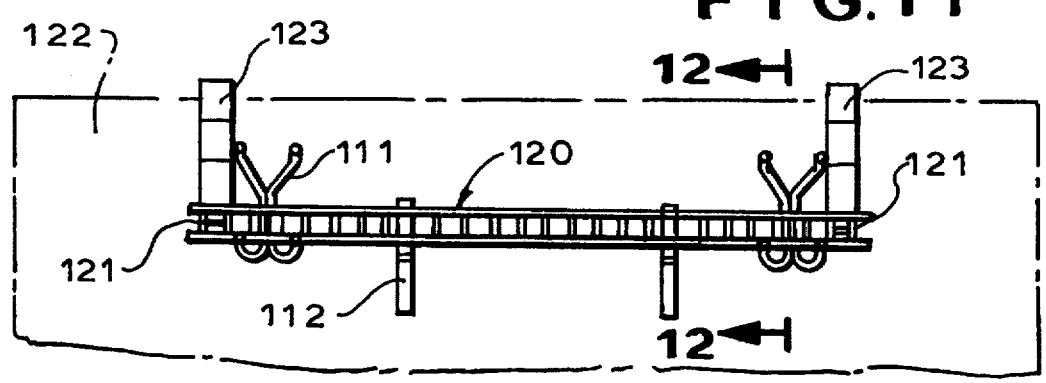
FIGS. 11 is a front elevational view respectively of a modified form of rack structure which may be configured with the materials of the invention.

In yet another form of the device, shown in FIG. 11, a rack element 120, which may be in the form of a flat, straight rack strip, is mounted by stand-off blocks 121 to a door 122, advantageously employing in addition a pair of thin sheet metal clips 123 which extend over the top of the door and both position the rack strip 120 and support some of its weight load. The rack element 120, as illustrated in FIG. 11, is shown as supporting clothing hooks 111 and hangers 112 as previously described.

As can be appreciated, the variety of rack structures which are possible for using the basic rack strip element of the invention are virtually limitless.

Figure 16:
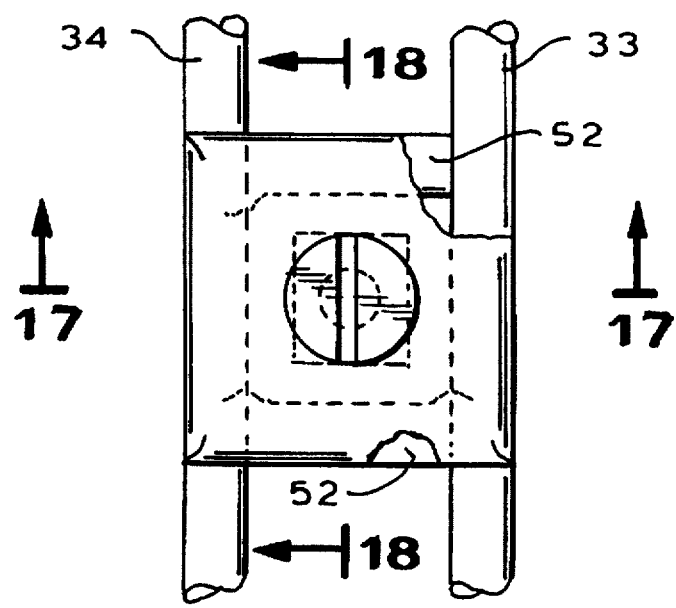
FIG. 16 is an enlarged front elevational view, with parts broken away, illustrating an advantageous form of mounting clamp useful to advantage in mounting the ladder-type rack elements of the invention to a supporting surface.
Figure 17:
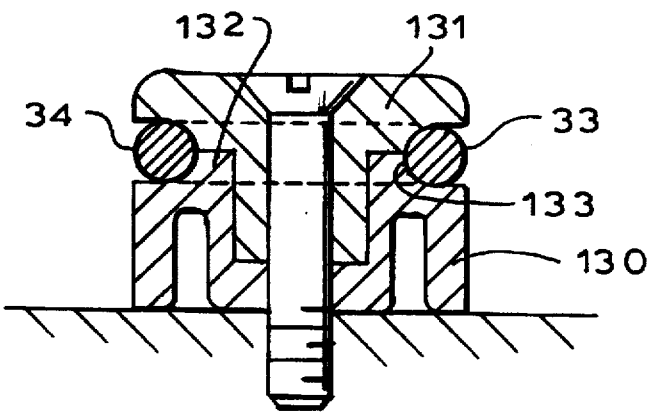
FIGS. 17 and 18 are cross sectional views as taken generally on lines 17—17 and 18—18 respectively of FIG. 16.
Figure 18:
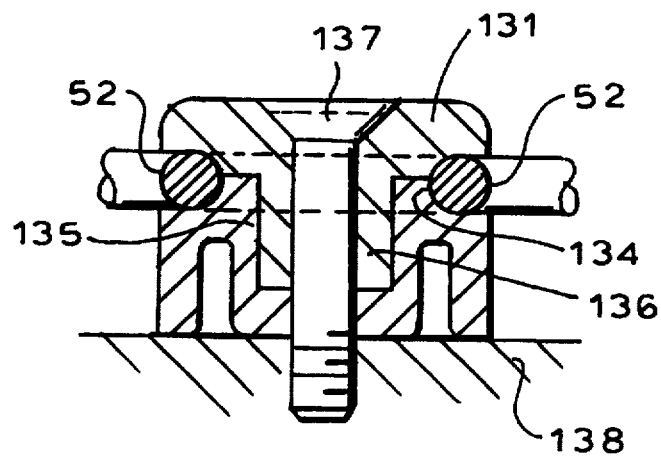

In FIGS. 16–18 there is shown a clamping block device which is particularly advantageous for mounting of the rack strip element previously described. In the illustrated form, the clamping block is of generally square cross section, having a base portion 130 and a clamping cap 131. The base portion 130 is formed with an upwardly projecting portion 132 of square configuration adapted to fit closely within the square opening defined by a pair of side elements 33, 34 and a pair of adjacent cross bar elements 52 of a section of rack strip material as previously described. The base member is further formed with opposed pairs of recesses 133 and 134 adapted for the reception and support of wire sections 33, 34 and 52 respectively.

To advantage, the base portion 134 is formed with a noncircular (preferably square) recess 135 into which is received a similarly noncircularly contoured boss 136 extending from the clamping cap 131. The cap and base 131, 130 are formed with passages to receive a screw 137 by which the clamping block may be secured to a support 138. The clamping block serves not only to tightly grip and support the section of rack strip, but also serves as a stand-off to space the rack strip a desirable distance from the supporting surface to facilitate the attachment of other elements of rack structure. The clamping block elements 130, 131 may be conveniently manufactured by injection molding, for example.

In certain installations, for example shower racks, various forms of kitchen racks, etc., it is desirable to construct rack structures in which sections of rack strip are oriented at an angle. Typically, although not necessarily, rack strips will be oriented at right angles. Although a section of rack strip material according to the invention may be bent at right angles, this is best done as a factory operation prior to finishing, and is not particularly suitable as a task for the home handyman.

Figure 19:
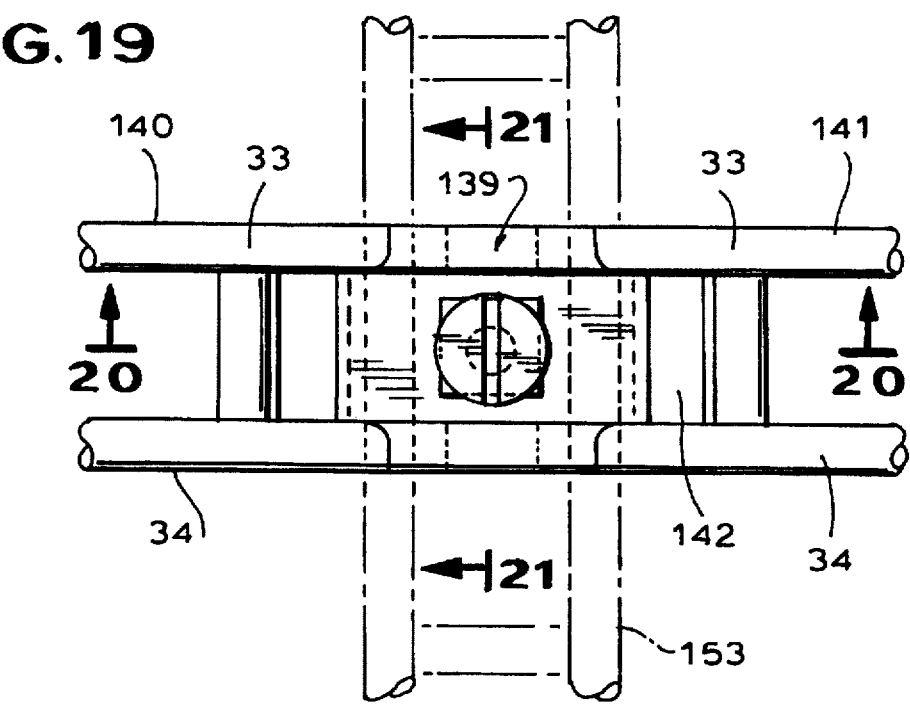
FIG. 19 is a front elevational view illustrating a form of clamping device useful for joining a pair of single plane ladder-type rack elements at an angle.
Figure 20:
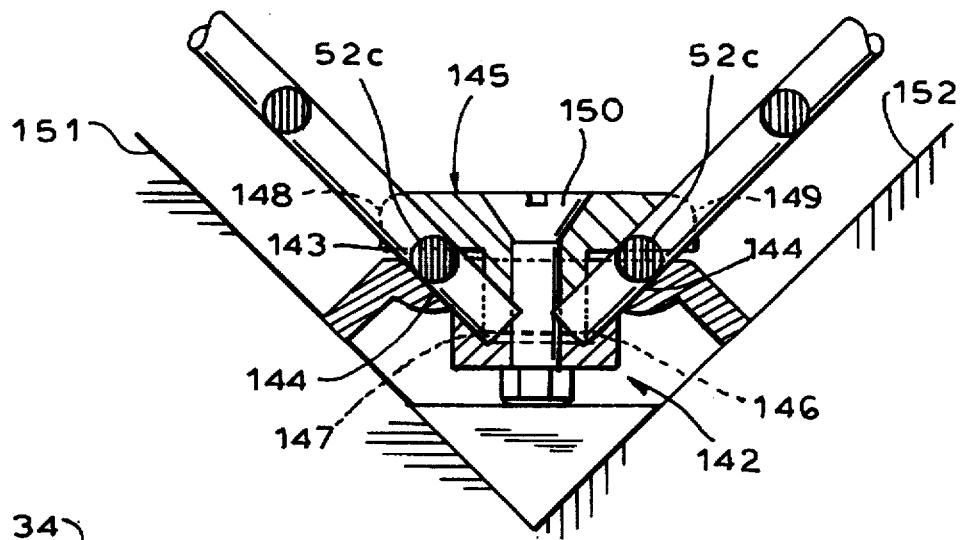
FIGS. 20 and 21 are cross sectional views as taken generally on lines 20—20 and 21—21 respectively of FIG. 19.
Figure 21:
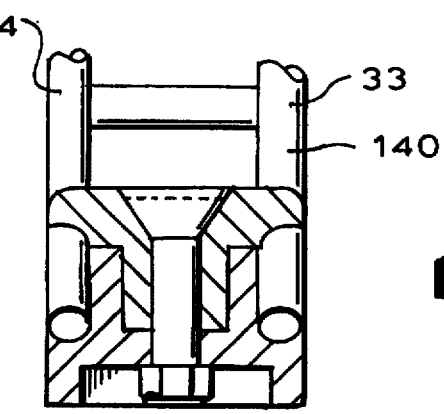

To enable angular structural arrangements to be assembled on a custom basis for home use, the invention contemplates the provision of clamping block elements for securing together two independent straight sections of rack strip and orienting such strip sections at a desired angle. One advantageous form of such clamping block 139 is shown in FIGS. 19–21, illustrating a device for securing two rack strip sections 140, 141 at a 90° angle. A base member 142 of the clamping block assembly is formed with spaced recesses 143 at opposite sides for receiving the endmost cross bar elements 52c, and is also provided with orienting recesses 144 at each side, extending laterally away from the recesses 143 and arranged to receive and align the respective side elements 33, 34 of the rack strips 140, 141.

As shown in FIG. 20, the base portion of the clamping block is adapted to be installed on the outside of a right angular corner formed by the two rack strips. A clamping cap 145, which is somewhat similar to the cap 131 previously described, is assembled with the body portion 142. To this end, the body portion has a noncircular recess 146 adapted to mate with a noncircular projection 147 on the clamping cap to orient the cap in a desired manner with respect to the body. The cap 145 advantageously is formed with overhanging flanges 148 at each side, which enclose recesses 149 for receiving the endmost cross bar elements 52c. As shown particularly in FIG. 20, when the clamping cap 145 is in its operative position, and secured by a nut and bolt assembly 150 or a screw extending into the wall structure, the endmost cross bar elements 52c are locked in assembled relation and can be oriented at the desired 90° relationship, suitable for installation at a corner formed by walls 151, 152. The clamping block 139 may also be used for joining two rack strip sections end-to-end in a linear fashion, or in other desired angles. In the fragmentary structure illustrated in FIGS. 19–21, it is contemplated that the individual rack strip elements 140, 141 may be mounted to supporting surfaces by suitable means, such as the clamping block devices of FIGS. 16–18.

The clamping block assembly of FIGS. 19–21 can also be utilized to advantage to support a vertically oriented rack strip deep in the apex of a corner area. As shown in FIG. 19, for example, a rack section 153, shown in phantom lines, secured in vertical orientation by the clamping block 139 and provides a vertical rack structure in the corner area, which is often otherwise unusable space.

The underlying feature of the invention is the novel method and apparatus which enables the low cost, high speed production of single plane ladder-type rack strip material which is flat, straight, and in all other respect altogether suitable for commercial production and sale. The single plane ladder-type material is ideally suited for the assembly of a wide variety of racks, shelving and the like. In particular, the material is ideally suited for the do-it-yourself individual, who can assemble custom racks for personal home use, designed specifically to the needs and desires of the individual. The basic rack strip material lends itself to the factory production of a large variety of modular units, such as support strips, hanging racks, shelves, cup and utensil holders and the like to provide the do-it-yourself person with components for almost any purpose.

Of particular significance to the production of commercial quality rack strip material is the managing of the operation by which individual cross bar members are Tee-welded to opposite side members in a single plane. Pursuant to the invention, this is accomplished by providing a first electrode, which is brought into pressure contact with a cross bar element conveyed to the welding position. Opposed second electrodes, of opposite polarity to the first electrode, are brought laterally into pressure contact with the side elements, directly opposite the ends of the cross bar element and momentarily maintained under substantial pressure while a high amperage welding current is caused to flow into central areas of the cross bar element and laterally therefrom substantially equally to both sides, through the weld interface. By, among other things, paying particular attention to achieving physical symmetry in the conductor means supplying the welding current, a substantially equal flow of current to the opposed weld interfaces is reliably achieved, such that the character of the weld at opposite sides is as closely the same as possible under the circumstances. By assuring that the opposite side weld will be as uniformly similar as practicable, the resulting rack strip which emerges from the welding operation is free of the extraordinary distortions previously experienced, and the emerging product is substantially flat and substantially straight such that touch-up processing in a final straightening section is adequate to achieve a high quality, commercially attractive product.

Among other features of the welding operation, the process of the invention advantageously utilizes rotary welding electrodes arranged in opposed relation to act inwardly on the side elements both during and after the welding operation. During indexing movements of the materials, however, inward pressure by the rotary welding electrodes is significantly reduced to avoid distorting the side elements in the areas between successive cross bars. In this respect, the material immediately after welding is at least locally soft and somewhat pliable, and subject to distortion. In the ideal case, this is avoided by subjecting the materials to maximum pressure (e.g. 800 pounds) during the welding operation itself, and reducing the pressure immediately to a much lower level (for example 100 pounds) during the indexing interval between welding operations.

It should be understood, of course, that the specific forms of the invention herein illustrated and described are intended to be representative only, as certain changes may be made therein without departing from the clear teachings of the disclosure. Accordingly, reference should be made to the following appended claims in determining the full scope of the invention.

I claim:

1. A method of manufacturing a ladder type rack strip comprising the steps of, (a) advancing first and second substantially continuous, spaced-apart wire rods longitudinally toward and into a welding position, (b) guiding said wire rods at said welding position along parallel paths defining a predetermined plane, (c) separately advancing individual cross bar elements toward and into said welding position and between said side members, (d) supporting said cross bar elements at said welding position in said predetermined plane and at right angles to said wire rods, (e) engaging each cross bar element, while at said welding position, symmetrically intermediate opposite ends of said cross bar element, with a first welding electrode of first polarity, while supporting said cross bar element over a substantial portion of its length, (f) engaging said spaced-apart wire rods, at said welding position, from opposite sides by opposed second welding electrodes of a second polarity, thereby forcing an inner surface area of each wire rod into contact with said cross bar element, (g) thereafter effecting symmetrical flows of welding current substantially equally and in opposite directions from said first welding electrode to said second welding electrodes at said welding position, thereby welding the ends of the cross bar element to inner surface areas of said wire rods, then, (h) advancing the welded cross bar element and inner surface areas from said welding position, and (i) repeating steps (c)–(h).

2. The method according to claim 1, wherein said advancing step includes feeding said wire rods toward said welding position along convergent paths such that, said rods are spaced apart a distance greater than the length of said cross bar elements.

3. The method according to claim 1, including maintaining said second electrodes in continuous contact with said wire rods at said welding position during said advancing step.

4. The method according to claim 3, wherein (a) said second welding electrodes are rotatably mounted and of circular configuration, and (b) said advancing step including rotating said electrodes.

5. The method according to claim 4, including urging said second welding electrodes inwardly with a first force during the flow of welding current and with a second and reduced force in intervals between the welding of successive cross bar elements to said wire rods.

6. The method according to claim 1, including (a) retaining said wire rods substantially stationary during the welding of each crossbar element to said wire rods, and (b) advancing said wire rods by intermittent indexing movements between the welding of successive crossbar elements to said wire rods.

7. The method according to claim 6, including effecting intermittent indexing movements of said rods by gripping a previously welded cross bar and applying a moving force thereto in the direction of advancement.

8. The method according to claim 1, including (a) advancing and intermittently cutting to length a third substantially continuous wire rod, thereby forming said cross bar elements, and (b) advancing said third wire rod generally at right angles to said first and second wire rods.

9. The method according to claim 8, including (a) engaging and supporting said cross bar elements by an indexable conveyor means and then indexing said conveyor means, thereby advancing said cross bar elements to said welding position.

* * * * *